April 6, 1954  H. PEDERSON  2,674,066
APPARATUS FOR CUTTING GLASS TUBING
Filed June 20, 1951
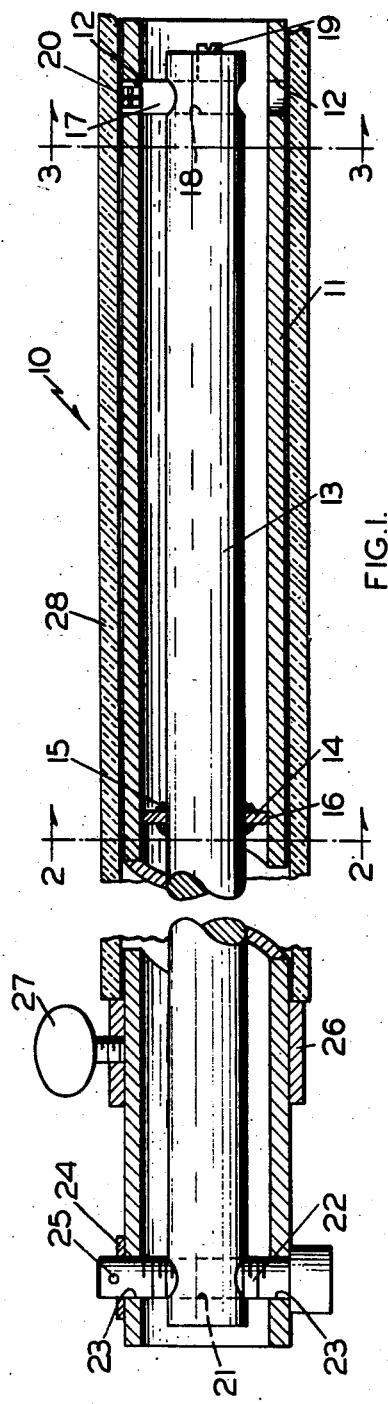
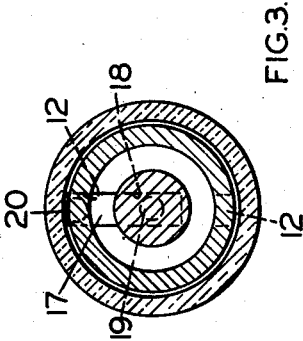
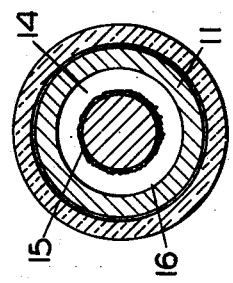
INVENTOR
HOLGER PETERSEN
ATT'Y Patented Apr. 6, 1954

2,674,066

UNITED STATES PATENT OFFICE 2,674,066

APPARATUS FOR CUTTING GLASS TUBING

Holger Pedersen, Stockholm, Sweden, assignor to International Harvester Company, a corporation of New Jersey Application June 20, 1951, Serial No. 232,510

1 Claim. (Cl. 49—52)

This invention relates to an improved apparatus for cutting glass tubing into lengths.

It is a prime object of this invention to provide an improved device for cutting glass tubing into lengths whereby the ends of the cut sections are free of burrs and are left with clean and square edges.

A further object is to provide an apparatus for accurately scoring the inner surface of a glass tube.

Still another object is to provide an apparatus or a fixture on which a glass tube may be supported and the inner surface of the tube may be operated on by means of a cutting tool to form a shallow annular fissure.

A more specific object is to provide an improved apparatus for operating upon the inner wall of a glass tube, the apparatus consisting of a tubular support over which the glass tube may be supported in telescopic relation. A cutting rod is pivotally supported within the tubular support, the cutting rod including a cutting member adapted to project through an opening in the tubular member for operating upon the inner wall of the glass tube which is supported upon the tubular member.

These and other objects will become more readily apparent upon a reading of the specification when examined in connection with the accompanying sheets of drawings.

In the drawings:

Figure 1 is a sectional view, in elevation, of an apparatus for operating upon the inner surface of a glass tube.

Figure 2 is a sectional view taken substantially along the line 2—2 of Figure 1.

Figure 3 is a sectional view taken substantially along the line 3—3 of Figure 1.

Referring now particularly to Figures 1, 2 and 3, an apparatus for scoring the inner surface of a glass tube is generally referred to by the reference character 10. The apparatus 10 comprises a tubular support or member 11 which is adapted to be firmly positioned on a table or other support (not shown) or the apparatus may be held in one hand of the operator. The tubular support 11 during the working operation is held in the horizontal position shown and includes a pair of oppositely disposed openings or slotted portions 12.

A rod 13 extends longitudinally within the tubular support 11. The rod 13 is supported centrally within the tubular support 11 by means of a disk 14 which is welded to the rod as indicated at 15. The disk 14 provides for pivotal action of the rod 13 with respect to the tubular support 11, the said disk being pivoted on the tubular support as indicated at the pivot point 16.

The rod 13 is provided at one end with a cutter support 17 which is adjustably positioned in a bore 18 provided in the rod 13. A set-screw 19 is threaded into the end of the rod 13 and is adapted to rigidly secure the cutter support 17 on the rod 13. A cutting wheel 20 is rotatably mounted on one end of the cutter support 17. As shown in Figures 1 and 3, the cutter support 17 and the wheel 20 are movable through one of the openings 12 so that they may be adjusted relatively thereto.

The other end of the rod 13 is provided with a threaded bore 21. An adusting screw 22 is threaded into the bore 21, the adjusting screw 22 extending through oppositely disposed openings 23 provided in the tubular support 11. One end of the adjusting screw 22 extends through a washer 24 which is held in place by means of a pin 25 extending transversely through one end of the adjusting screw 22. By turning the adjusting screw 22, the end of the rod 15 may be moved and the rod is pivoted on the pivot point 16 thereby providing for adjustable movement of the cutting wheel 20 with respect to the opening 12.

A stop collar 26 encircles the tubular support 12 and may be moved longitudinally relatively thereto. A wing nut 27 is threaded through the collar 26 and may engage the tubular support 11 for rigidly securing the collar 26 thereto.

A glass tube 28 shown in the figures is telescopically supported over the tubular support 11. The stop collar 26 may be moved into a variety of positions with respect to the cutting wheel 20 and thus different lengths of tubing may be easily cut since the distance between the collar and the cutting wheel determines the length of a cut section.

During the operation, the glass tube 28 is slid over the tubular support 13 until it engages the stop collar 26. At this point the cutting wheel 20 may be retracted into the tubular support 13 and the tubing can be easily and readily slid over the tubular support without interference. After the glass tube 28 is in place, the adjusting screw 22 is turned so that the rod 13 pivots on the pivot point 16. The cutter support 17 is thus moved through the opening 12 and the cutting wheel 20 is moved into engagement with the inner surface of the glass tube. The rod 13, because of its length and manner of positioning acts as a spring urging the cutting wheel 20 into cutting engagement with the inner surface of the tube. The glass tube 28 is then rotated on the tubular support and the cutting wheel scores the inner surface of the tube. It is apparent, of course, that the same result can be obtained by rotating the whole fixture relative to the glass tube. By virtue of the novel arrangement shown the cutting wheel 20 may be accurately adjusted relative to the glass surface, the engagement of the cutting wheel being so slight that only a very shallow and tiny annular fissure is formed in the glass tube.

After the very shallow glass fissure has been formed, the rod 13 may be so pivoted that the cutter support 17 is again retracted into the tubular support 13 and the device is ready for another scoring or cutting operation. The tubing thus scored with this device can be subjected to a heating and cooling operation, which due to the internal stresses set up in the material, causes the fissure to deepen whereupon the tubing can readily be snapped into two leaving square and clearly cut edges at the beveled ends of the tube.

It can now be seen that an improved apparatus has been set forth for use in cutting tubing into lengths. The term "cutting" is used in a general sense. The action of the cutting wheel 20 is more of a scoring operation, since a very shallow fissure is formed. The subsequent heat- and cooling action which takes place serve to deepen the fissure which is formed and to thus sever the tube. By the novel apparatus indicated, glass tubing can be scored with ease and efficiency and the subsequent heating and cooling operation can be more effectively performed.

It is believed that the objects of the invention have been fully achieved therefore and it must be understood that changes and modifications may be made which do not depart from the spirit of the invention as disclosed nor the scope thereof as defined in the appended claim.

What is claimed is:

A device for operating on the inner wall of a glass tube comprising a tubular member having an opening through its wall adjacent one end thereof, a rod extending longitudinally within said tubular member, a cutting member supported on the rod adjacent one end thereof, said cutting member being in registry with said opening and being movable therethrough for operating on the inner surface of a glass tube telescopingly supported on said tubular member, said rod having a threaded bore adjacent its other end, means for pivotally supporting said rod within said tubular member comprising a disk connected to and encircling said rod between the ends thereof, said disk being pivotally supported on the inner surface of said tubular member, and an adjusting means including a threaded member extending laterally through the tubular member and through the threaded bore of said rod, said adjusting means being operable to pivot the rod with said disk on the inner surface of the tubular member whereby the cutting mechanism is moved relative to the opening and to the inner surface of a glass tube.

References Cited in the file of this patent

UNITED STATES PATENTS

| Number | Name | Date |
|--------|------|------|
| 365,190 | Lindgren | June 21, 1887 |
| 672,312 | Cook | Apr. 16, 1901 |
| 818,213 | Amos et al. | Apr. 17, 1906 |
| 2,116,129 | Stringer | May 3, 1938 |
| 2,125,864 | Auckland | Aug. 9, 1938 |
| 2,125,922 | Hopfield | Aug. 9, 1938 |